(12) United States Patent
Shimoyama

(10) Patent No.: US 9,742,257 B2
(45) Date of Patent: Aug. 22, 2017

(54) CAMERA SHAKE CORRECTION APPARATUS

(71) Applicant: OLYMPUS CORPORATION, Shibuya-ku, Tokyo (JP)

(72) Inventor: Masanori Shimoyama, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/083,175

(22) Filed: Mar. 28, 2016

(65) Prior Publication Data

US 2016/0366339 A1 Dec. 15, 2016

(30) Foreign Application Priority Data

Jun. 11, 2015 (JP) ................................. 2015-118632

(51) Int. Cl.
| | |
|---|---|
| *H04N 5/228* | (2006.01) |
| *H02K 41/035* | (2006.01) |
| *H04N 5/232* | (2006.01) |
| *G03B 5/00* | (2006.01) |

(52) U.S. Cl.
CPC ........... *H02K 41/0356* (2013.01); *G03B 5/00* (2013.01); *H04N 5/23287* (2013.01); *G03B 2205/0038* (2013.01); *G03B 2205/0069* (2013.01)

(58) Field of Classification Search
None
See application file for complete search history.

(56) References Cited

U.S. PATENT DOCUMENTS

| 8,400,516 B2* | 3/2013 | Yamada ................... G03B 5/00 |
| | | 348/208.2 |
| 2006/0284495 A1* | 12/2006 | Seo ..................... H04N 5/23248 |
| | | 310/12.06 |
| 2007/0014555 A1* | 1/2007 | Hirunuma ................ G03B 5/00 |
| | | 396/55 |
| 2007/0058076 A1* | 3/2007 | Seo ....................... H04N 5/2253 |
| | | 348/373 |
| 2009/0160953 A1* | 6/2009 | Nagata ..................... G03B 5/00 |
| | | 348/208.6 |
| 2010/0214426 A1* | 8/2010 | Kimura ................ G02B 27/646 |
| | | 348/208.99 |

(Continued)

FOREIGN PATENT DOCUMENTS

JP 10062676 A 3/1998

*Primary Examiner* — Twyler Haskins
*Assistant Examiner* — Wesley Chiu
(74) *Attorney, Agent, or Firm* — Holtz, Holtz & Volek PC

(57) ABSTRACT

A camera shake correction apparatus includes a target position setting unit, a current setting unit, a driving unit, a magnetic flux detector, and an arithmetic unit. The target position setting unit sets a target position of a movable member. The current setting unit sets a current value to move the movable member to the target position. The driving unit drives the movable member with respect to a fixed member based on the set current set value. The magnetic flux detector detects a magnetic flux value changed with movement of the movable member. The arithmetic unit calculates a third magnetic flux value by subtracting a second magnetic flux value estimated to be generated from the driving unit based on the current set value from a first magnetic flux value actually detected by the magnetic flux detector.

8 Claims, 9 Drawing Sheets

(56) References Cited

U.S. PATENT DOCUMENTS

| | | | | |
|---|---|---|---|---|
| 2014/0132251 A1* | 5/2014 | Enomoto | ............... | G01D 5/145 324/207.11 |
| 2014/0379103 A1* | 12/2014 | Ishikawa | .................. | G03B 5/00 700/56 |
| 2015/0198783 A1* | 7/2015 | Shimotsu | ................. | G02B 7/08 359/814 |

* cited by examiner

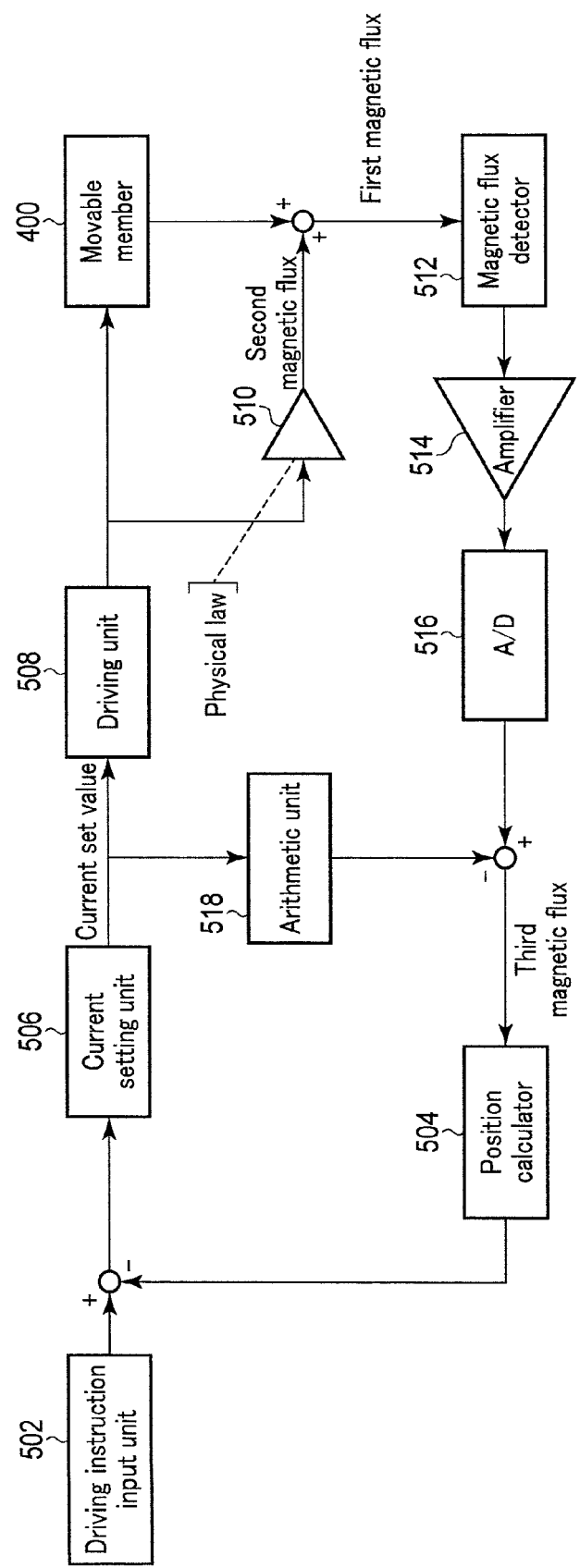
F I G. 5

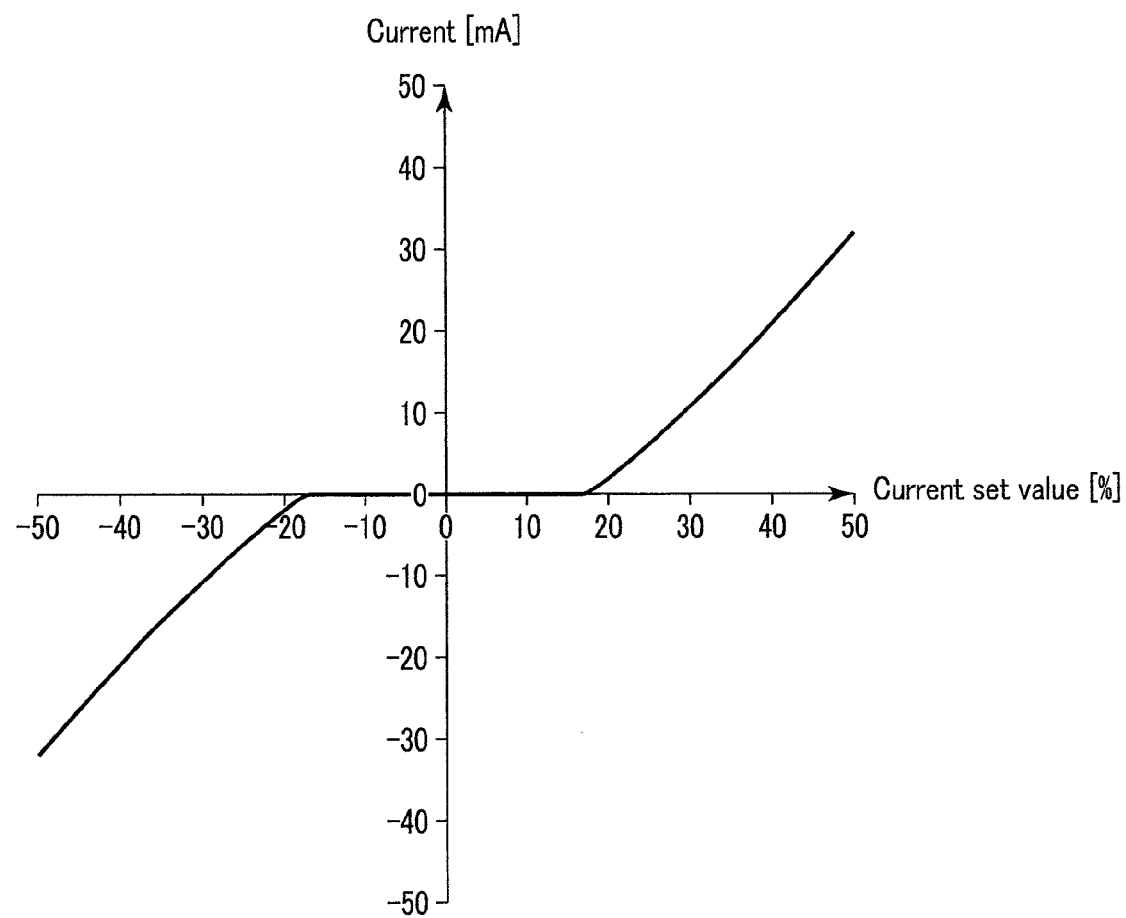
F I G. 6

CAMERA SHAKE CORRECTION APPARATUS

CROSS-REFERENCE TO RELATED APPLICATIONS

This application is based upon and claims the benefit of priority from prior Japanese Patent Application No. 2015-118632, filed Jun. 11, 2015, the entire contents of which are incorporated herein by reference.

BACKGROUND OF THE INVENTION

1. Field of the Invention

The invention relates to a camera shake correction apparatus.

2. Description of the Related Art

Known camera shake correction apparatuses suppress image blurring produced in images due to camera shaking caused by movement of lenses serving as optical members and imaging devices serving as imaging members. Camera shake correction apparatuses of this type include known apparatuses having a structure in which a movable member including an optical member or an imaging member is moved with respect to a fixed member with a VCM (voice coil motor) using a coil and a magnet.

Camera shake correction apparatuses are required to control the position of the movable member with high accuracy. To achieve the control, the apparatuses are required to detect the position of the movable member with high accuracy. Known camera shake correction apparatuses are formed of a combination of a position detecting magnet and a magnetic flux detection element such as a Hall element. In recent years, camera shake correction apparatuses including a magnet, both serving as a magnet for detecting the position of the movable member and a magnet for driving the movable member, have been presented size reduction of the camera shake correction apparatuses. In the case of adopting the structure in which a magnet serves as both a magnet for detecting the movable member and a magnet for detecting the position of the movable member, the magnetic flux detection element may detect not only the magnetic flux based on the magnet for driving the movable member (for detecting the position), but also the magnetic flux based on the coil disposed in the vicinity thereof. When the magnetic flux based on the coil is detected by the magnetic flux detection element, the magnetic flux detection element outputs a false position signal. Such a false position signal causes a significant deterioration in position control accuracy.

To prevent such deterioration, the drive control apparatus in Jpn. Pat. Appln. KOKAI Pub. No. 10-62676 discloses a structure of estimating a magnetic flux generated in a coil from a current flowing through the coil to cancel an influence of a false position signal, estimating a false position signal from the estimated magnetic flux, and performing feedback control of the current flowing through the coil to cancel the influence the estimated false position signal.

BRIEF SUMMARY OF THE INVENTION

According to a first aspect of the invention, a camera shake correction apparatus driving a movable member including an optical member or an imaging member with respect to a fixed member, based on a detected camera shake amount, comprising: a target position setting unit setting a target position to which the movable member is to be moved based on the camera shake amount; a current setting unit setting a current value to move the movable member to the target position; a driving unit formed of a coil disposed in one of the movable member and the fixed member, and a magnet disposed in the other of the movable member and the fixed member and used for detecting a position of the movable member and driving the movable member, the driving unit driving the movable member with respect to the fixed member based on the set current set value; a magnetic flux detector detecting a magnetic flux value changed with movement of the movable member when the movable member is actually driven by the driving unit; and an arithmetic unit calculating a third magnetic flux value by subtracting a second magnetic flux value estimated to be generated from the driving unit based on the current set value from a first magnetic flux value actually detected by the magnetic flux detector, when the set current set value belongs to a nonlinear region, wherein the arithmetic unit updates the current set value to move the movable member to the target position to a second current set value corresponding to the third magnetic flux value, and the driving unit drives the movable member based on the second current set value.

According to a second aspect of the invention, a camera shake correction apparatus driving a movable member including an optical member or an imaging member with respect to a fixed member, based on a detected camera shake amount, comprising: a target position setting unit setting a target position to which the movable member is to be moved based on the camera shake amount; a current setting unit setting a current set value to move the movable member to the target position; a driving unit driving a voice coil motor formed of a driving coil disposed in one of the movable member and the fixed member and a magnet disposed in the other of the movable member and the fixed member and used for detecting a position of the movable member and driving the movable member, based on the current set value, and thereby moving the movable member with respect to the fixed member; a magnetic flux detector detecting a magnetic flux value changed with movement of the movable member by the driving unit; an arithmetic unit calculating a third magnetic flux value by subtracting a second magnetic flux value estimated to be generated based on a current value flowing through the driving coil from a first magnetic flux value actually detected by the magnetic flux detector, when the current set value belongs to a nonlinear region in which the relationship of a magnetic flux value to the current set value is nonlinear; and a position calculator calculating a present position of the movable member from the third magnetic flux value, wherein the current setting unit sets the current set value based on the target position and the present position.

Advantages of the invention will be set forth in the description which follows, and in part will be obvious from the description, or may be learned by practice of the invention. The advantages of the invention may be realized and obtained by means of the instrumentalities, and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 5 is a block diagram related to position control of the movable member in a camera shake correction unit;

FIG. 6 is a diagram illustrating output current characteristics of a driving unit of PWM driving;

DETAILED DESCRIPTION OF THE INVENTION

Figure 1:
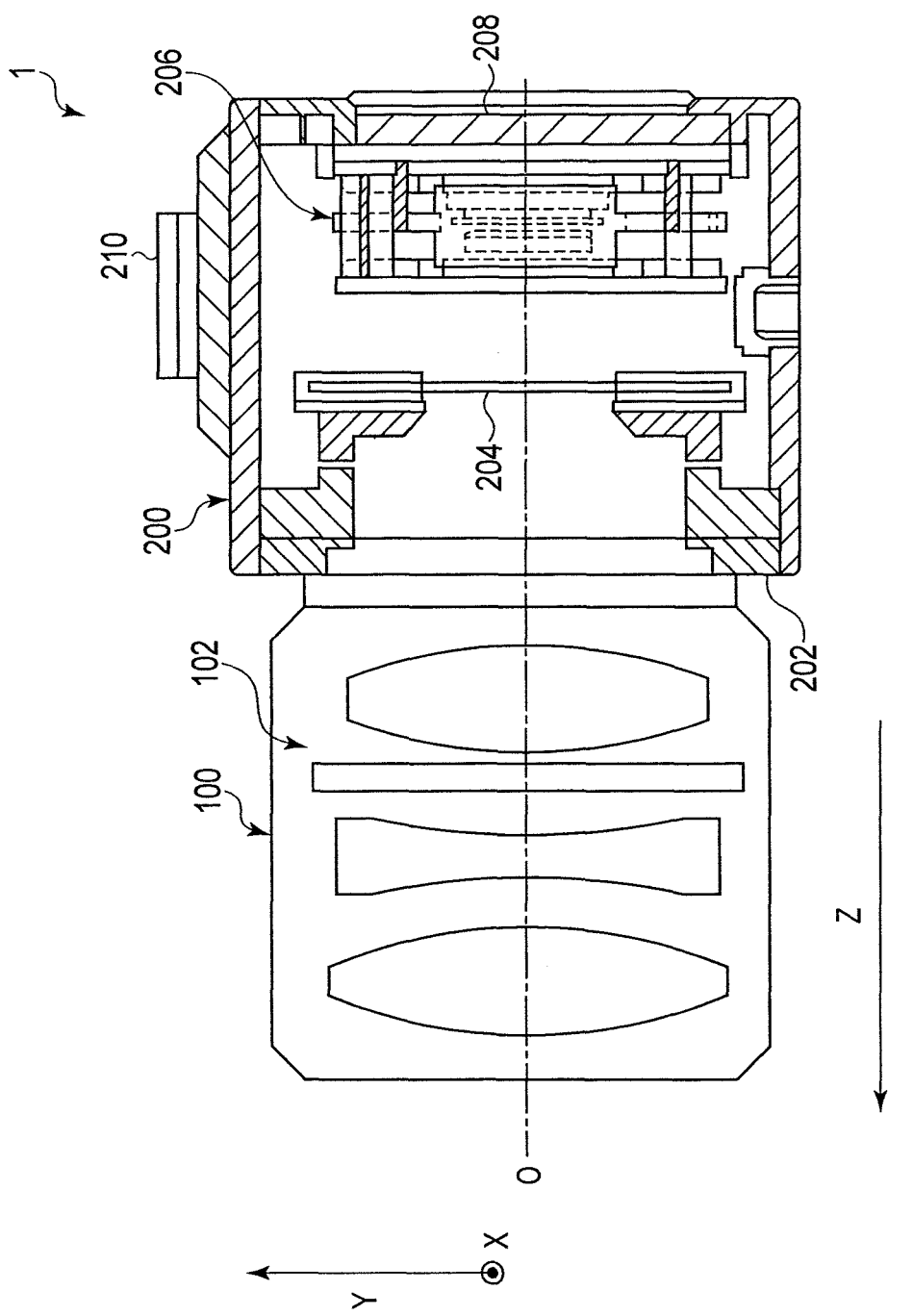
FIG. 1 is a diagram illustrating a schematic structure of an imaging apparatus including a camera shake correction apparatus according to an embodiment of the present invention.

An embodiment of the present invention will be explained hereinafter with reference to the drawings. FIG. 1 is a diagram illustrating a schematic structure of an imaging apparatus including a camera shake correction apparatus according to the present embodiment. The imaging apparatus 1 illustrated in FIG. 1 includes an interchangeable lens 100 and a main body 200. The interchangeable lens 100 is attached to the main body 200 via a mount 202 provided on the main body 200. The interchangeable lens 100 and the main body 200 are connected to communicate with each other by attaching the interchangeable lens 100 to the main body 200. In this manner, the interchangeable lens 100 and the main body 200 operate in cooperation. The imaging apparatus 1 is not always an imaging apparatus with an interchangeable lens. For example, the imaging apparatus 1 may be an imaging apparatus including an integrated lens.

The interchangeable lens 100 includes an optical system 102. The optical system 102 includes, for example, a plurality of lenses and a diaphragm, and serves as an optical system to make a luminous flux from a subject (not illustrated) incident on a camera shake correction unit 206 of the main body 200. Although the optical system 102 of FIG. 1 includes a plurality of lenses, the optical system 102 may be formed of a single lens. The optical system 102 may include a focus lens, or may be formed as a zoom lens. In these cases, at least part of the lenses of the optical system 102 is configured to be movable along a Z direction serving as a direction running along the optical axis O.

The main body 200 includes a shutter 204, the camera shake correction unit 206, a monitor 208, and an operating unit 210.

The shutter 204 is a focal plane shutter disposed on the front side (front side in the Z direction) of the camera shake correction unit 206, for example. The shutter 204 is opened to change the camera shake correction unit 206 to an exposure state. The shutter 204 is closed to change the camera shake correction unit 206 to a light shielding state.

The camera shake correction unit 206 includes an imaging element, and images a subject (not illustrated) to generate a photographed image related to the subject. The camera shake correction unit 206 moves a movable member equipped with the imaging element with respect to a fixed member by VCMs (voice coil motors) using coils and magnets, to correct image blurring generated in the photographed image due to camera shaking. The structure of the camera shake correction unit 206 will be explained in detail later.

The monitor 208 is, for example, a liquid crystal display, and displays an image based on the photographed image generated by the camera shake correction unit 206. The monitor 208 also displays a menu picture for performing various settings of the imaging apparatus 1 by the user. The monitor 208 may include a touch panel.

The operating unit 210 is, for example, a release button. The release button is a button for instructing the user's imaging apparatus 1 to start photographing. The operating unit 210 includes various operating units other than the release button.

Figure 2:
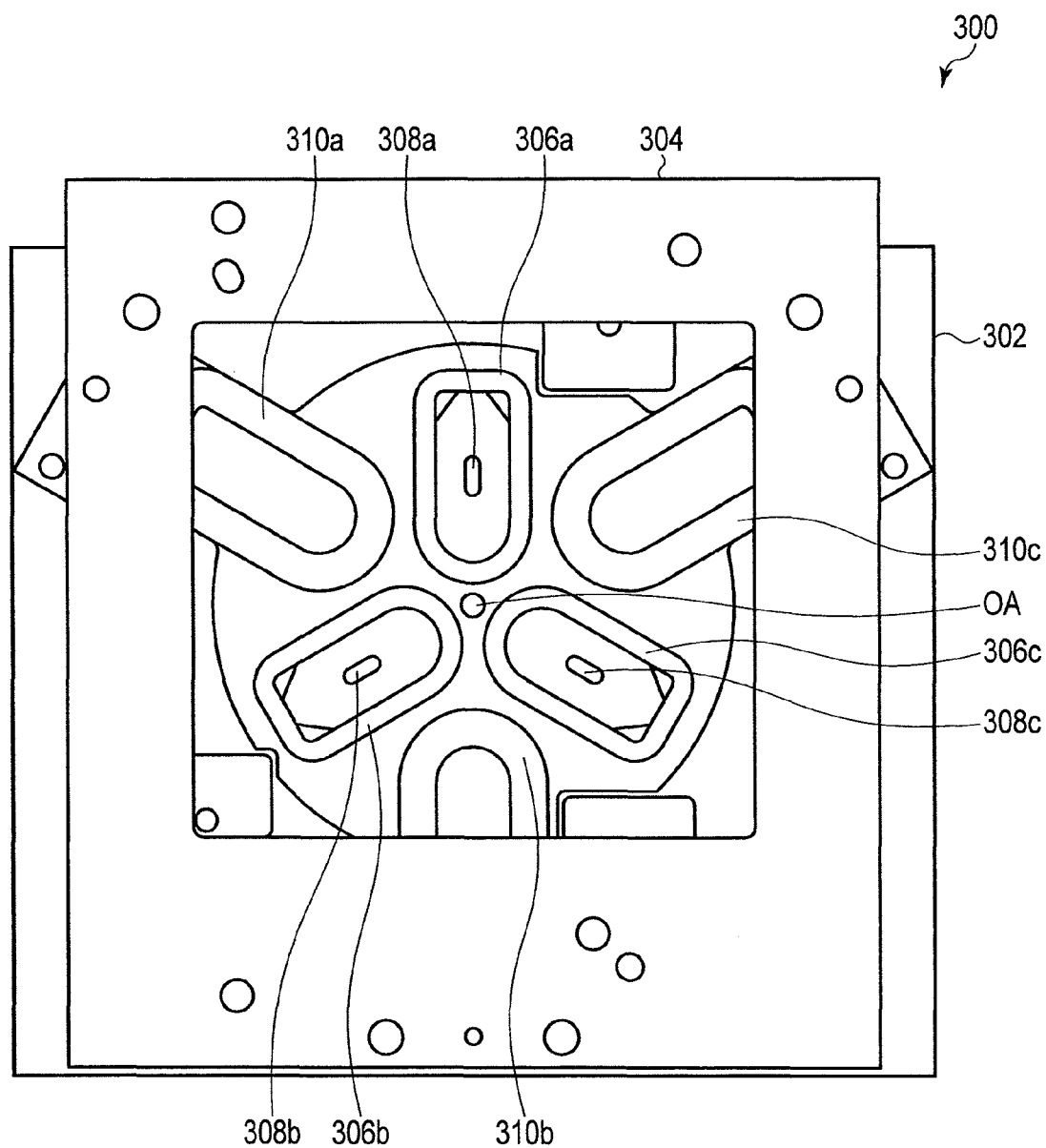
FIG. 2 is a configuration diagram of a fixed member.
Figure 3:
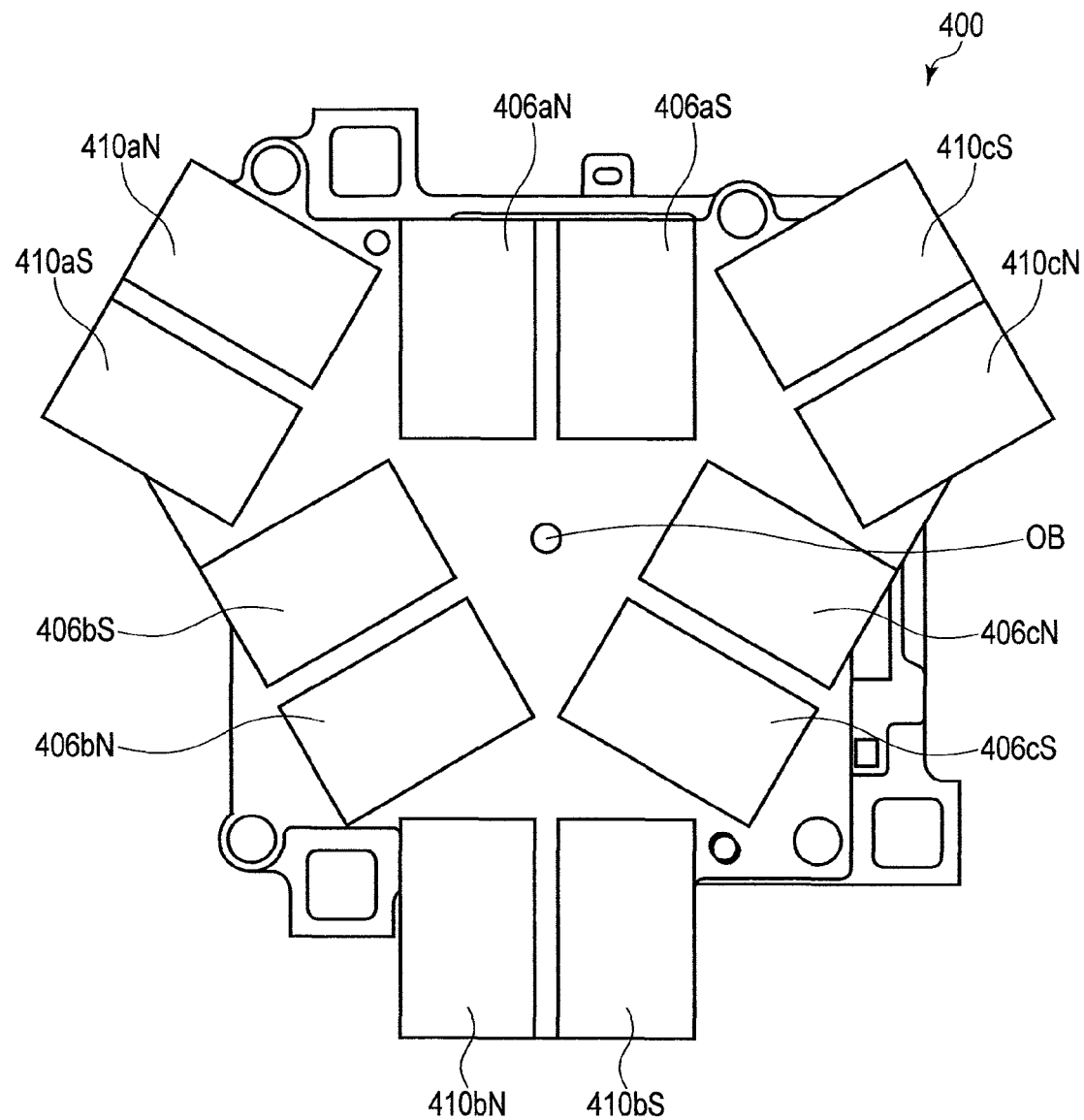
FIG. 3 is a configuration diagram of a movable member.

The following is an explanation of a structure of the camera shake correction unit 206; in particular, a structure related to correction of image blurring. The camera shake correction unit 206 schematically includes a fixed member and a movable member. In the structure, the camera shake correction unit 206 moves the movable member in parallel within a plane perpendicular to the optical axis O (X direction and Y direction in FIG. 1). The camera shake correction unit 206 also moves the movable member in a rotational direction around the optical axis O. The fixed member and the movable member will be explained hereinafter separately. FIG. 2 is a configuration diagram of the fixed member in the camera shake correction unit 206. FIG. 3 is a configuration diagram of the movable member in the camera shake correction unit 206.

First, the configuration of the fixed member will be explained hereinafter. As illustrated in FIG. 2, the fixed member 300 includes a fixed frame 302 and a pressing plate 304. The fixed frame 302 is a plate member having a substantially square shape, and is fixed to the main body 200 so that a center OA corresponds to the optical axis O of the optical system 102. The fixed frame 302 is provided with three driving coils 306a, 306b, and 306c. The driving coils 306a, 306b, and 306c are arranged in positions of 120° that are point-symmetrical with respect to the center OA of the fixed frame 302. Hall sensors 308a, 308b, and 308c are arranged in the respective centers of gravity of the driving coils 306a, 306b, and 306c. Each of the Hall sensors 308a, 308b, and 308c outputs a signal corresponding to the surrounding magnetic flux density.

The pressing plate 304 is a plate member having a substantially square shape, like the fixed frame 302, and is fixed to the fixed frame 302, for example, to hold the movable member with the fixed frame 302. The pressing plate 304 is provided with three auxiliary coils 310a, 310b, and 310c. The auxiliary coil 310a is disposed in a position of 60° in a counterclockwise direction with respect to the driving coil 306a. In the same manner, the auxiliary coil 310b is disposed in a position of 60° in a counterclockwise direction with respect to the driving coil 306b, and the auxiliary coil 310c is disposed in a position of 60° in a counterclockwise direction with respect to the driving coil 306c. These auxiliary coils 310a, 310b, and 310c are provided to supplement the magnetic flux for driving the movable member 400. The auxiliary coils 310a, 310b, and 310c may be omitted, if a sufficient magnetic flux can be generated by the driving coils 306a, 306b, and 306c.

In the example of FIG. 2, the three driving coils 306a, 306b, and 306c are arranged in positions that are point-symmetrical with respect to the center OA of the fixed frame 302 and are apart from each other by 120°. However, the three driving coils 306a, 306b, and 306c are not necessarily arranged in positions that are point-symmetrical with respect to the center OA of the fixed frame 302, and are apart from each other by 120°. In the same manner, the auxiliary coils 310a, 310b, and 310c may not be arranged in positions rotated by 60° with respect to the driving coils 306a, 306b, and 306c.

The following is an explanation of the configuration of the movable member. As illustrated in FIG. 3, the movable member 400 includes magnets 406aN and 406aS, magnets 406bN and 406bS, and magnets 406cN and 406cS. The magnets 406aN and 406aS are magnets corresponding to the driving coil 306a. The magnets 406bN and 406bS are magnets corresponding to the driving coil 306b. The magnets 406cN and 406cS are magnets corresponding to the driving coil 306c.

Figure 4:
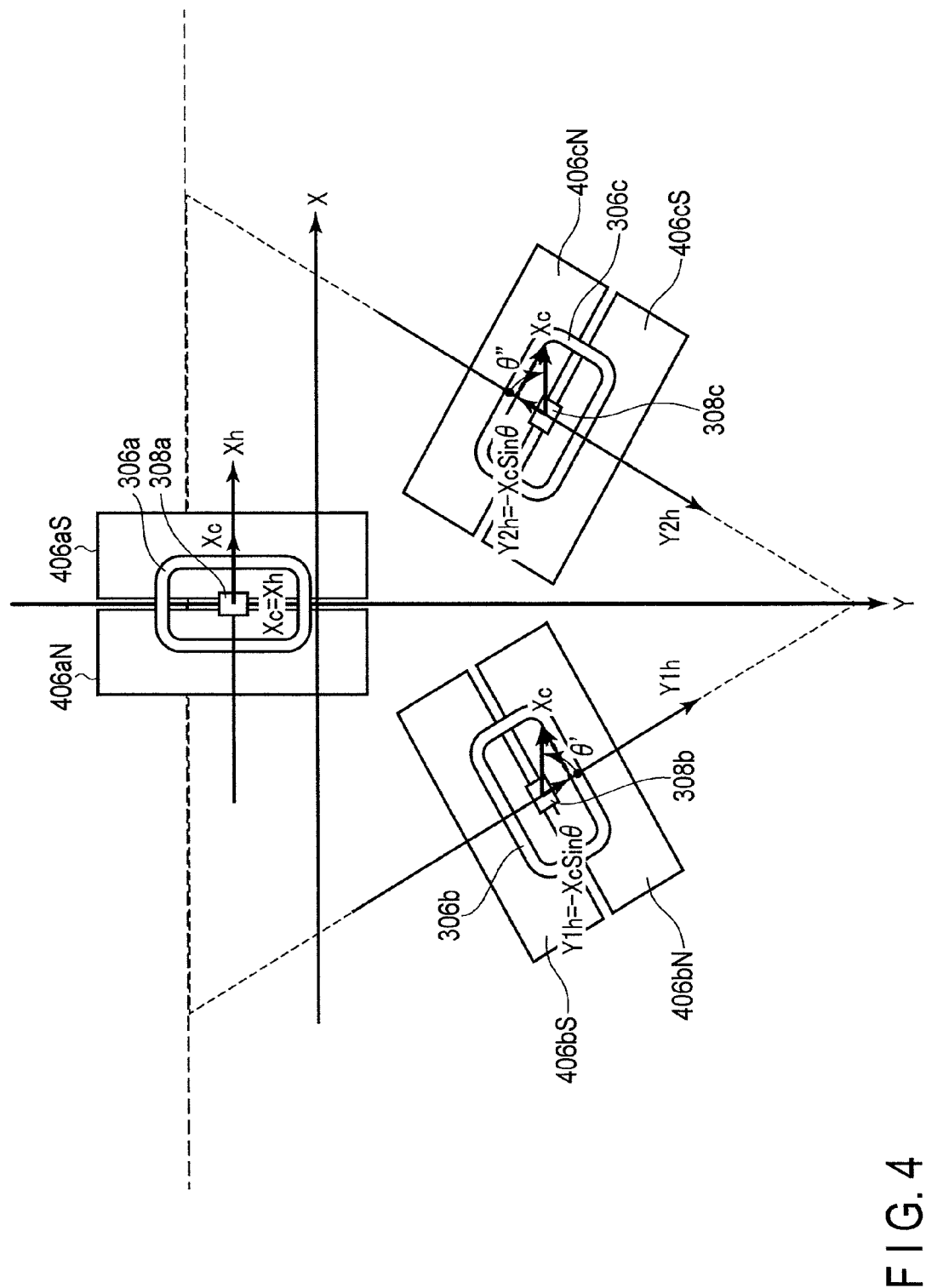
FIG. 4 is a diagram illustrating a relationship between the movable member and the fixed member when the movable member is in a neutral state.

FIG. 4 illustrates the relationship between the movable member 400 and the fixed member 300 when the movable member 400 is in a neutral state. The neutral state of the movable member 400 is a state where the center OB of the movable member 400 matches with the center OA of the fixed member 300.

When the movable member 400 is in the neutral state, the Hall sensor 308a is positioned in a boundary portion between the magnet 406aN and the magnet 406aS, as illustrated in FIG. 4. In this state, half of the driving coil 306a is opposed to the magnet 406aN, and the other half of the driving coil 306a is opposed to the magnet 406aS. The Hall sensor 308b is positioned in a boundary portion between the magnet 406bN and the magnet 406bS. In this state, half of the driving coil 306b is opposed to the magnet 406bN, and the other half of the driving coil 306b is opposed to the magnet 406bS. In the same manner, the Hall sensor 308c is positioned in a boundary portion between the magnet 406cN and the magnet 406cS. In this state, half of the driving coil 306c is opposed to the magnet 406cN, and the other half of the driving coil 306c is opposed to the magnet 406cS.

The movable member 400 also includes magnets 410aN and 410aS, magnets 410bN and 410bS, and magnets 410cN and 410cS. The magnets 410aN and 410aS are magnets corresponding to the auxiliary coil 310a. The magnets 410bN and 410bS are magnets corresponding to the auxiliary coil 310b. The magnets 410cN and 410cS are magnets corresponding to the auxiliary coil 310c.

The following is an explanation of operations of the camera shake correction unit 206. To simplify the explanation, the following explanation illustrates operations of the camera shake correction unit 206 in the case where the auxiliary coils 310a, 310b, and 310c are omitted.

In the configurations illustrated in FIG. 2 and FIG. 3, three voice coil motors (VCM) are formed of a set of the driving coil 306a and the magnets 406aN and 406aS, a set of the driving coil 306b and the magnets 406bN and 406bS, and a set of the driving coil 306c and the magnets 406cN and 406cS. The three VCMs have different driving force operating directions. For example, suppose that the VCM (hereinafter referred to as "VCM X") formed of the set of the driving coil 306a and the magnets 406aN and 406aS generates a driving force Xh that matches with the X axis. The VCM (hereinafter referred to as "VCM Y1") formed of the set of the driving coil 306b and the magnets 406bN and 406bS generates a driving force Y1h having an angle θ' with respect to the X axis. The VCM (hereinafter referred to as "VCM Y2") formed of the set of the driving coil 306c and the magnets 406cN and 406cS generates a driving force Y2h having an angle θ" (−θ') with respect to the X axis. The movable member 400 is relatively moved with respect to the fixed member 300 by a resultant force of the driving forces of the three VCMs.

For example, suppose the case where the movable member 400 is driven by X along the X axis direction. To achieve it, a driving force Xc in the X axis direction should be generated by each of the VCM X, VCM Y1, and VCM Y2. The VCM X generates a driving force along the X axis direction. For this reason, the VCM X should be driven by the driving force Xh=Xc. By contrast, each of the VCM Y1 and the VCM Y2 generates a driving force including not only the X axis direction, but also the Y axis direction. Accordingly, the driving forces Y1h and Y2h should be set to generate the driving force Xc in the X axis direction. For example, the driving force Y1h is calculated as follows. First, the following relationship of (Expression 1) is established based on FIG. 4.

$$Y1h = Xc \cdot \cos \theta' \qquad \text{(Expression 1)}$$

To replace the relationship of (Expression 1) with the relationship on the XY coordinate system serving as the coordinate system of the imaging apparatus 1, θ' is replaced with the angle θ formed between the Y1h and the Y axis. As is clear from FIG. 4, θ' is π/2−θ. Using the relationship, (Expression 1) is replaced with the expression of θ. Thereby, Y1h is represented by the following (Expression 2).

$$Y1h = Xc \cdot \sin \theta \qquad \text{(Expression 2)}$$

In the same manner, the driving force Y2h is calculated as the following (Expression 3).

$$Y2h = -Xc \cdot \sin \theta \qquad \text{(Expression 3)}$$

θ in (Expression 3) is an angle formed between Y2h and the Y axis.

As described above, by properly controlling the driving forces of the VCM X, VCM Y1, and VCM Y2, the movable member 400 is moved in parallel or rotated in the XY plane illustrated in FIG. 4. When the position of the movable member 400 is changed in this manner, the magnitudes of magnetic fluxes detected by the respective Hall sensors 308a, 308b, and 308c change. Each of the Hall sensors 308a, 308b, and 308c outputs changes in magnetic flux (changes in magnetic flux density) as a signal. The position of the movable member 400 is controlled in accordance with the signals.

FIG. 5 is a block diagram related to position control of the movable member 400 of the camera shake correction unit 206 in the imaging apparatus 1 according to the present embodiment. As illustrated in FIG. 5, the camera shake correction unit 206 includes a driving instruction input unit 502, a position calculator 504, a current setting unit 506, a driving unit 508, a magnetic flux detector 512, an amplifier 514, an analog/digital (A/D) converter 516, and an arithmetic unit 518. FIG. 5 is a block diagram illustrating a structure obtained by putting structures related to the three VCMs formed together in the movable member 400. The actual imaging apparatus 1 has the structures of the number equal to the number of the VCMs, that is, the structures equal to FIG. 5 corresponding to the respective three VCMs.

The driving instruction input unit 502 generates a target position signal indicating a target position serving as the target of position control of the movable member 400.

The position calculator 504 outputs a current position signal indicating a present position of the movable member 400 based on the input magnetic flux signal. The details thereof will be explained later. The position calculator 504 outputs a present position signal based on a magnetic flux signal (third magnetic flux signal) in a state where the nonlinear characteristic of the magnetic flux detected by the magnetic flux detector 512 is removed in accordance with the nonlinear characteristic of the driving unit 508.

The current setting unit 506 includes a digital filter formed of a combination of a plurality of IIR (Infinite Impulse Response) filters, and outputs a current set value that is generated based on a deviation signal between the target position signal output from the driving instruction input unit 502 and the present position signal output from the position calculator 504 to the driving unit 508. The current set value indicates a current value that is required to flow through the driving coil to drive the movable member 400 to the target position, and is generated by applying the digital filter to the deviation signal.

The driving unit 508 supplies a current to the corresponding driving coil of the movable member 400 based on the current set value that is output from the current setting unit 506. The driving unit 508 of the present embodiment performs PWM (Pulse Width Modulation) driving on the driving coil, based on the current set value output from the current setting unit 506. In this case, the current set value is a value indicating a duty percentage of PWM driving. The current set value also includes a plus or minus sign according to the driving direction of the movable member 400. For example, when a maximum positive current that can be supplied by the driving unit 508 is supplied to the driving coil, the current set value is set to +100%. In this manner the position of the movable member 400 is controlled by controlling the current flowing through the driving coil in accordance with the current set value set by the current setting unit 506.

The magnetic flux detector 512 takes in a magnetic flux signal that is output from the corresponding one of the Hall sensors 308a, 308b, and 308c, and outputs a first magnetic flux signal. The first magnetic flux signal that is output from the magnetic flux detector 512 includes a magnetic flux signal based on the magnetic flux from the magnet provided on the movable member 400. In addition, when the magnetic flux detector 512 is provided in the vicinity of the driving coil as in the present embodiment, the first magnetic flux signal that is output from and detected by the magnetic flux detector 512 includes a signal based on a second magnetic flux generated by the flow of a current through the driving coil. FIG. 5 illustrates that the second magnetic flux is generated from a virtual second magnetic flux generator 510 corresponding to the driving coil. The magnetic flux detector 512 is illustrated as the magnetic flux detector that outputs a first magnetic flux signal in which the second magnetic flux generated by the second magnetic flux generator 510 is superimposed on the magnetic flux from the movable member 400.

The amplifier 514 amplifies the first magnetic flux signal output from the magnetic flux detector 512. The amplification factor of the amplifier 514 is, for example, determined in advance. The A/D converter 516 converts the first magnetic flux signal amplified by the amplifier 514 into a digital value.

The arithmetic unit 518 generates a third magnetic flux signal obtained by removing a component of the second magnetic flux from the first magnetic flux signal (actually, the A/D converted value of the first magnetic flux signal output from the A/D converter 516) detected by the magnetic flux detector 512, and outputs the generated third magnetic flux signal to the position calculator 504. The details of arithmetic operation of the arithmetic unit 518 will be explained later.

The following is an explanation of operations of the imaging apparatus 1 illustrated in FIG. 5. For example, when camera shaking occurs, the driving instruction input unit 502 outputs a target position signal. Namely, the driving instruction input unit 502 generates a target position signal to drive the movable member 400 to a position that cancels image blurring caused by the camera shaking and the like.

The current setting unit 506 generates a current set value based on a deviation of the present position signal from the target position signal, and sets the generated current set value on the driving unit 508. The driving unit 508 outputs a current corresponding to the current set value to the driving coil of the fixed member 300. The movable member 400 is moved by the driving force based on the current supplied to the driving coil.

When the movable member 400 is moved, the magnetic flux detector 512 detects a first magnetic flux, including the magnetic flux accompanying the movement of the movable member 400 and the second magnetic flux accompanying supply of the current to the driving coil. If the position of the movable member 400 is controlled in this manner based on the first magnetic flux, erroneous position control is performed by the second magnetic flux. For this reason, in the present embodiment, the processing is performed to remove the second magnetic flux from the first magnetic flux in the arithmetic unit 518.

When the first magnetic flux signal is output from the magnetic flux detector 512, the amplifier 514 amplifies the first magnetic flux signal with the predetermined amplification factor. Thereafter, the A/D converter 516 samples the first magnetic flux signal amplified by the amplifier 514, and converts the first magnetic flux signal into a digital value.

When the first magnetic flux signal is taken into the A/D converter 516, the arithmetic unit 518 performs processing to remove the component of the second magnetic flux from the first magnetic flux signal. The processing will be explained hereinafter.

The following is an explanation of the relationship between a current flowing through the driving coil, and a magnetic flux generated by the current. Generally, a minute magnetic field dH, generated in the magnetic flux detector 512 existing in a position r from a minute driving coil having a length dl and through which a current I flows, is provided as in the following (Expression 4) from the Biot-Savart law.

$$dH = Idl \times r / 4\pi r^3 \qquad \text{(Expression 4)}$$

As is clear (Expression 4), as a physical law, a current flowing through a driving coil is directly proportional to a magnetic field generated by the current. This means that a current flowing through a driving coil is also proportional to the second magnetic flux detected by the magnetic flux detector 512. Accordingly, the second magnetic flux value can be estimated by detecting a current flowing through the driving coil. In addition, when the current set value is proportional to the current flowing through the driving coil, the second magnetic flux value can be estimated from the current set value, even when the current flowing through the driving coil cannot be detected.

Actually, the current flowing through the driving coil is not always proportional to the current set value. For example, the driving unit 508 may not output a current proportional to the current set value to the driving coil according to the structure thereof. FIG. 6 is a diagram illustrating PWM driving output current characteristics of the driving unit 508. The horizontal axis in FIG. 6 is the current set value, and the vertical axis is the output current value. Specifically, in the example of FIG. 6, the driving unit 508 does not output current regardless of the value of the current set value, when the current set value is 0% to ±15%. The driving unit 508 outputs a current smaller than the magnitude to be output in accordance with the current set value, when the current set value is ±15% to ±30%. In addition, the driving unit 508 outputs a current of a magnitude to be output in accordance with the current set value, when the current set value is ±30% or more. As described above, the PWM driving output current characteristics of the driving unit 508 have regions of the current set value in which a current smaller than the magnitude to be output in accordance with the current set value is output. The regions will be referred to as nonlinear regions hereinafter. Although FIG. 6 illustrates an example, the driving unit 508 of PWM driving has nonlinear characteristics similar to those illustrated in FIG. 6. The current flowing through the driving coil is not always proportional to the current set value, due to various causes in addition to the characteristics of the driving unit 508 as described above.

Figure 7:
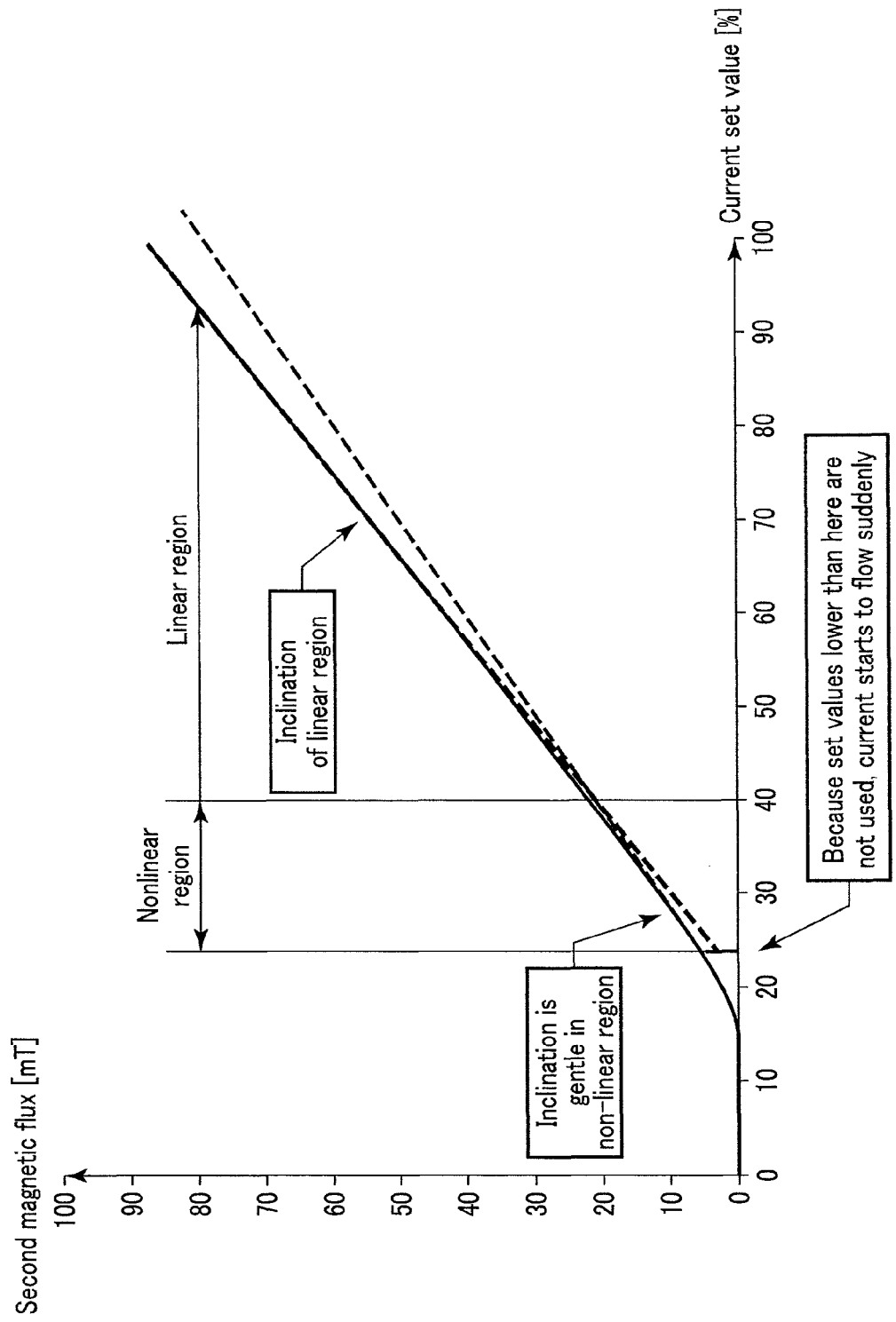
FIG. 7 is a diagram illustrating a characteristic curve of a current set value and a second magnetic flux.

When the current set value and the output current have the relationship as illustrated in FIG. 6, the current set value and the second magnetic flux are indicated by a characteristic curve as illustrated in FIG. 7. The horizontal axis in FIG. 7 is a current set value, and the vertical axis is a magnetic flux density value (second magnetic flux value). FIG. 7 illustrates characteristics for the region in which the current set value is positive. The region in which the current set value is negative also has characteristics similar to the characteristics for the region in which the current set value is positive. As is clear from the relationship between the current set value and the output current illustrated in FIG. 6, no current flows through the driving coil when the current set value is less than +15% in FIG. 7, and no second magnetic flux is generated. When the current set value is +15% to less than +30%, a current smaller than the magnitude to be output in accordance with the current set value is output, and consequently the second magnetic flux value is also a value smaller than expected. When the current set value is +30% or more, a current of a magnitude to be output in accordance with the current set value is output, and the second magnetic flux value is a value in accordance with the current set value.

As described above, because the current set value is not proportional to the second magnetic flux value due to various causes, position control is provided with a large error when the second magnetic flux value is estimated by a simple linear estimation. By contrast, in the present embodiment, an accurate second magnetic flux value is estimated by considering the characteristics of the nonlinear region. An example of a method for estimating the second magnetic flux value in this manner is a method using an estimation expression indicating the characteristic curve illustrated in FIG. 7. The estimation expression is assumed as follows. In the following assumption, the current set value is a value equal to or larger than a first threshold in the characteristic curve illustrated in FIG. 7. The first threshold is a current set value with which a predetermined current value is output from the driving unit 508. In this case, a current is output from the driving unit 508 at the time when the current set value is set.

As described above, because the current set value is proportional to the second magnetic flux value in the linear region, the straight line in the linear region can be represented by "Y=AX". X is the current set value, and Y is the second magnetic flux value. A is a change amount of the magnetic flux when a predetermined current change is provided, and obtained as an adjusting value or a theoretical value for the individual driving coil. For example, A is obtained by measuring the magnetic flux when a current actually flows through the driving coil.

Next, assuming that the second magnetic flux value changes with respect to the current set value in a substantially linear manner in the nonlinear region, although the inclination thereof in the nonlinear region is different from that in the linear region, an estimation expression indicating the characteristic curve is assumed to be "Y=A'X+B'". B' is an offset. As is also clear from FIG. 7, the inclination of the straight line in the nonlinear region is also obtained by reducing the inclination of the straight line in the linear region by a certain predetermined amount. Accordingly, the straight line in the nonlinear region can be expressed as follows.

$$Y=aAX+B' \quad \text{(Expression 5)}$$

a is an attenuation coefficient indicating a ratio of inclination of the straight line in the linear region and inclination of the straight line in the nonlinear region. When the X coordinate of a second threshold serving as an intersection point of the straight line of the linear region and the nonlinear region is XTH, the offset B' is indicated as follows.

$$AXTH=aAXTH+B'$$

$$B'=(1-a)AXTH \quad \text{(Expression 6)}$$

The threshold XTH is determined by measuring a current set value with which a current value output from the driving unit 508 is proportional to the current set value, by using an adjuster capable of measuring a current value flowing through the driving coil in accordance with the current set value in the manufacturing process of the imaging apparatus 1. When the threshold XTH is determined, the offset B' is calculated. In this manner, the linear expression of the linear region and the linear expression of the nonlinear region are indicated as follows.

$$Y=A'X+B'(-XTH<X, X<+XTH)=aAX+A(1-a)XTH \quad \text{(Expression 7)}$$

$$Y=AX(X\leq-XTH, +XTH\leq X) \quad \text{(Expression 8)}$$

The nonlinear region may not be approximated using only one straight line. Specifically, the nonlinear region may be approximated using a plurality of straight lines. The nonlinear region may be approximated using a curve.

Figure 8:
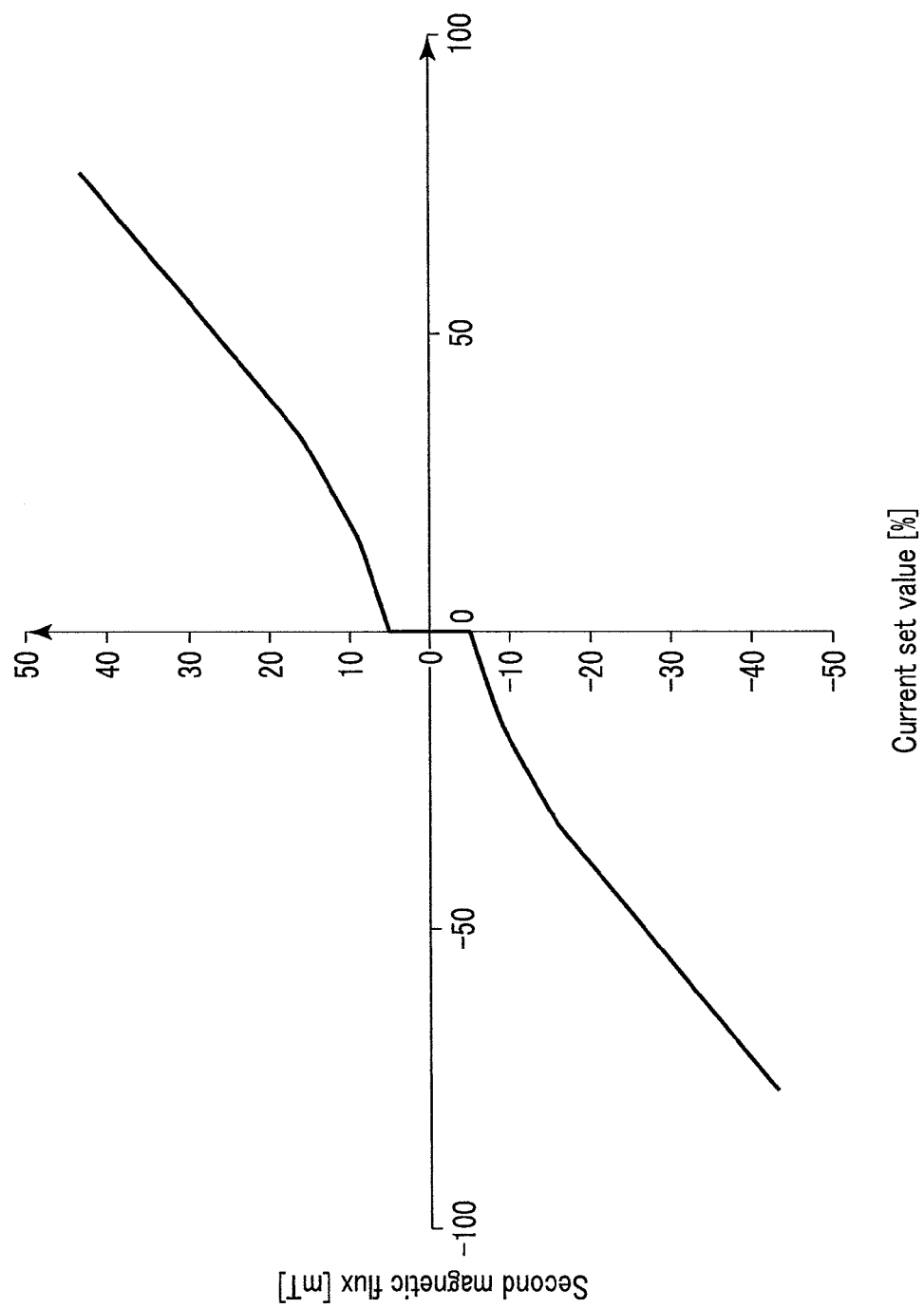
FIG. 8 is a diagram illustrating estimated curves second magnetic flux value estimated based on estimated expressions of a linear expression of a linear region and a linear expression of a nonlinear region.

FIG. 8 illustrates estimated curves of the second magnetic flux value estimated based on the estimation expressions of the linear expression of the linear region and the linear expression of the nonlinear region. The arithmetic unit 518 selects the estimation expression in accordance with the magnitude of the input current set value, to estimate the second magnetic flux value. The arithmetic unit 518 modifies the estimated second magnetic flux value to an A/D converted value, and calculates a third magnetic flux value by subtracting the second magnetic flux value from the A/D converted value (first magnetic flux value) of the first magnetic flux signal.

Figure 9:
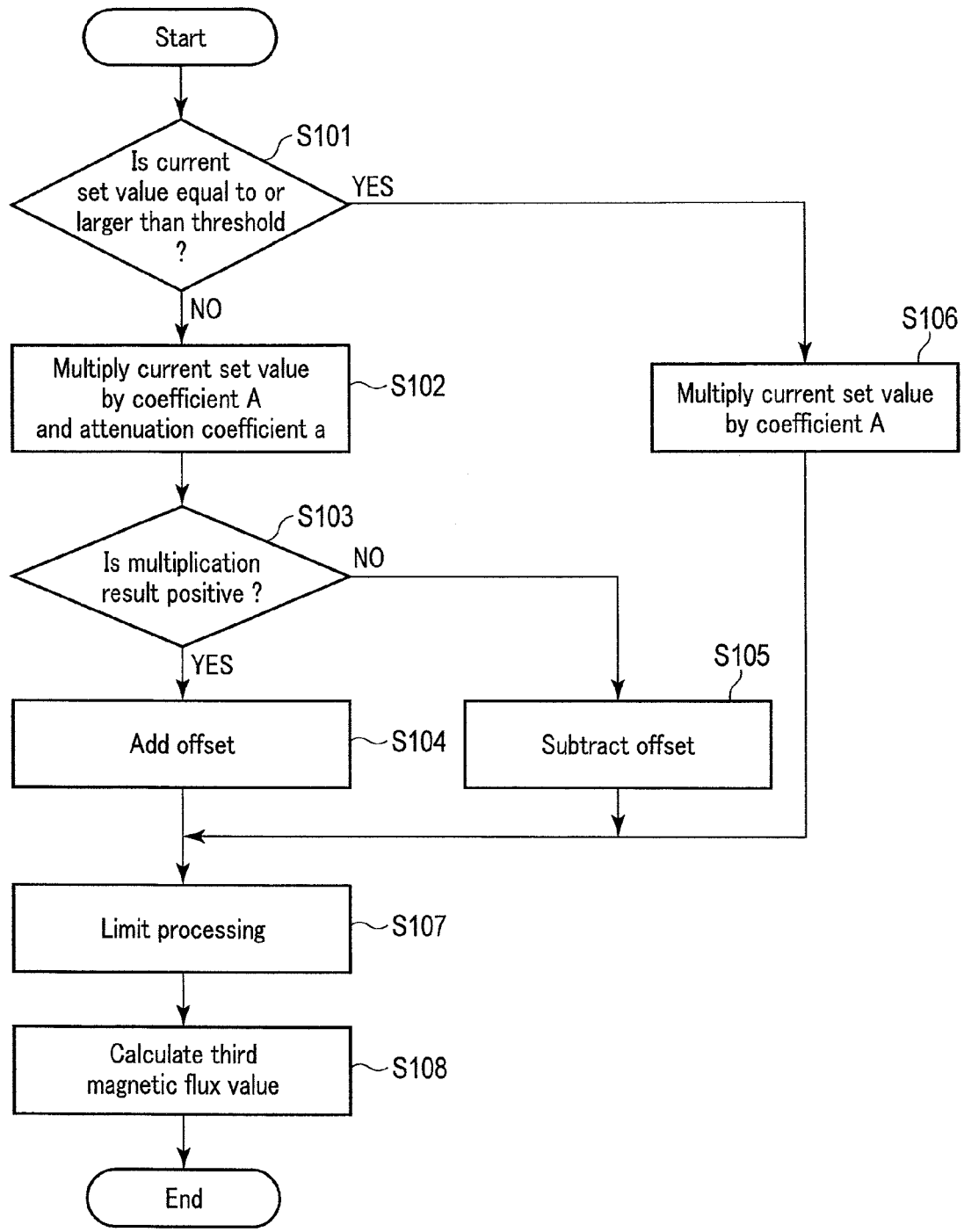
FIG. 9 is a flowchart illustrating a series of processing performed by an arithmetic unit.

FIG. 9 is a flowchart illustrating a series of processing performed by the arithmetic unit 518. The estimation expressions of (Expression 7) and (Expression 8) described above are stored in advance in a memory (not illustrated) of the arithmetic unit 518.

In Step S101, the arithmetic unit 518 determines whether the current set value is equal to or higher than the threshold XTH. When the arithmetic unit 518 determines that the current set value is less than the threshold XTH in Step S101, the processing goes to Step S102. When the arithmetic unit 518 determines that the current set value is equal to or larger than the threshold XTH in Step S101, the processing goes to Step S106.

When it is determined that the current set value less than the threshold XTH in Step S101, the current set value belongs to the nonlinear region. Accordingly, the second magnetic flux value is estimated using the estimation expression of the nonlinear region. In Step S102, the arithmetic unit 518 multiplies the current set value by the coefficient A and the attenuation coefficient a in the estimation expression of (Expression 7)

In Step S103, the arithmetic unit 518 determines whether the result of multiplication in Step S102 is positive or negative. When the result of Step S102 has a positive value in Step S103, the processing goes to Step S104. In Step S104, the arithmetic unit 518 adds the offset in the estimation expression of (Expression 7) to the result of Step S102. When the result of Step S102 has a negative value in Step S103, the processing goes to Step S105. In Step S105, the arithmetic unit 518 subtracts the offset in the estimation expression of (Expression 7) from the result of Step S102. After the processing in Step S104 or Step S105, the processing goes to Step S107.

When it is determined that the current set value is equal to or larger than the threshold XTH in Step S101, the current set value belongs to the linear region. Accordingly, the second magnetic flux value is estimated using the estimation expression of the linear region. In Step S106, the arithmetic unit 518 multiplies the current set value by the coefficient A in the estimation expression of (Expression 8). Thereafter, the processing goes to Step S107.

In Step S107, the arithmetic unit 518 performs limit processing. The limit processing is processing to limit the estimated second magnetic flux value to the maximum value, when the estimated second magnetic flux value is larger than a value (the maximum value of the second magnetic flux value) that is expected when the maximum current set value is set.

In Step S108, the arithmetic unit 518 calculates the third magnetic flux value by subtracting the estimated second magnetic flux value from the input first magnetic flux value. Thereafter, the arithmetic unit 518 outputs the calculated third magnetic flux value to the position calculator 504. Thereafter, the processing in FIG. 9 is ended.

As explained above, the present embodiment has the structure of estimating the second magnetic flux value generated by the current flowing through the driving coil in consideration of nonlinear characteristics of the driving unit 508 and the like, and that enables determination of the third magnetic flux value obtained by accurately removing the influence of the second magnetic flux value serving as a false signal from the first magnetic flux value, even when the current flowing through the driving coil cannot be actually measured. Position control is performed based on the deviation of the present position signal calculated in accordance with the third magnetic flux signal from the target position signal, and thereby the present embodiment enables accurate driving of tracking and secures stability thereof.

In the embodiment described above, the second magnetic flux value is directly estimated from the estimation expression. By contrast, the second magnetic flux value may be estimated by once estimating a current value flowing through the driving coil and thereafter multiplying the current value by a coefficient of proportionality.

In the example described above, the second magnetic flux value is estimated with the estimation expression. However, the method for estimating the second magnetic flux value is not limited to estimation expressions, but another method may be used. For example, the relationship between the current set value and the second magnetic flux value may be stored as table data in the memory of the arithmetic unit 518.

The embodiment described above illustrates the example with the structure in which the fixed member 300 is provided with the driving coils and the magnetic flux detectors, and the movable member 400 is provided with magnets. The technique of the present embodiment may be applied to the structure in which the fixed member is provided with magnets, and the movable member is provided with driving coils and magnetic flux detectors.

The embodiment described above illustrates the camera shake correction unit in which the imaging element is moved by the movable member 400. The technique of the present embodiment may be applied to the camera shake correction unit 206 in which the optical system 102 is moved by the movable member 400.

Each of the processing in the embodiment described above may be stored as a program that can be executed by a CPU or the like serving as a computer. In addition, the program may be stored and distributed in a storage medium of an external storage device, such as a memory card, a magnetic disk, an optical disk, and a semiconductor memory. The CPU and the like may execute the processing described above, by reading the program stored in a storage medium of an external storage device, and controlling operations by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera shake correction apparatus driving a movable member including an optical member or an imaging member with respect to a fixed member, based on a detected camera shake amount, comprising:

a target position setting unit setting a target position to which the movable member is to be moved based on the camera shake amount;

a current setting unit setting a current value to move the movable member to the target position;

a driving unit formed of a coil disposed in one of the movable member and the fixed member, and a magnet disposed in the other of the movable member and the fixed member and used for detecting a position of the movable member and driving the movable member, the driving unit driving the movable member with respect to the fixed member based on the set current set value;

a magnetic flux detector detecting a magnetic flux value changed with movement of the movable member when the movable member is actually driven by the driving unit; and an arithmetic unit calculating a third magnetic flux value by subtracting a second magnetic flux value estimated to be generated from the driving unit based on the current set value from a first magnetic flux value actually detected by the magnetic flux detector, when the set current set value belongs to a nonlinear region, wherein the arithmetic unit updates the current set value to move the movable member to the target position to a second current set value corresponding to the third magnetic flux value, and the driving unit drives the movable member based on the second current set value.

2. The camera shake correction apparatus according to claim 1, wherein the arithmetic unit includes a storage unit storing in advance the relationship between a current flowing through the coil and the current set value, and estimates the second magnetic flux value based on data stored in advance in the storage unit.

3. The camera shake correction apparatus according to claim 2, wherein the arithmetic unit includes a determination unit determining whether the set current set value belongs to the nonlinear region, and the determination unit determines that a region in which one of a current set value or a current value is 0 and the other of the current set value or the current value is not 0 is the nonlinear region.

4. The camera shake correction apparatus according to claim 1, wherein the arithmetic unit calculates a current estimation curve in which the relationship between a current flowing through the coil and the current set value changes linearly in the nonlinear region, and determines the third magnetic flux value based on the current estimation curve.

5. A camera shake correction apparatus driving a movable member including an optical member or an imaging member with respect to a fixed member, based on a detected camera shake amount, comprising:
a target position setting unit setting a target position to which the movable member is to be moved based on the camera shake amount;
a current setting unit setting a current set value to move the movable member to the target position;
a driving unit driving a voice coil motor formed driving coil disposed in one of the movable member and the fixed member and a magnet disposed in the other of the movable member and the fixed member and used for detecting a position of the movable member and driving the movable member, based on the current set value, and thereby moving the movable member with respect to the fixed member;
a magnetic flux detector detecting a magnetic flux value changed with movement of the movable member by the driving unit;
an arithmetic unit calculating a third magnetic flux value by subtracting a second magnetic flux value estimated to be generated based on a current value flowing through the driving coil from a first magnetic flux value actually detected by the magnetic flux detector, when the current set value belongs to a nonlinear region in which the relationship of a magnetic flux value to the current set value is nonlinear; and
a position calculator calculating a present position of the movable member from the third magnetic flux value, wherein the current setting unit sets the current set value based on the target position and the present position.

6. The camera shake correction apparatus according to claim 5, wherein the arithmetic unit includes a storage unit storing in advance the relationship between the current set value and the second magnetic flux value, and estimates the second magnetic flux value based on the relationship stored in advance in the storage unit.

7. The camera shake correction apparatus according to claim 6, wherein the arithmetic unit includes a determination unit determining whether the current set value belongs to the nonlinear region, and the determination unit determines that a region in which a current flowing through the driving coil is 0 for the current set value that is not 0 is the nonlinear region.

8. The camera shake correction apparatus according to claim 6, wherein the arithmetic unit calculates an estimation curve indicating the relationship between the current set value and the second magnetic flux value, and determines the third magnetic flux value based on the estimation curve, when the current set value belongs to the nonlinear region.

* * * * *